April 18, 1950 E. G. HOWE 2,504,126
CEILOMETER RECORDER

Filed April 12, 1945 3 Sheets-Sheet 1

Inventor:
Edward G. Howe,
by Harry E. Dunham
His Attorney.

April 18, 1950     E. G. HOWE     2,504,126
CEILOMETER RECORDER

Filed April 12, 1945     3 Sheets-Sheet 3

Inventor:
Edward G. Howe,
by Harry E. Dunham
His Attorney.

Patented Apr. 18, 1950

2,504,126

UNITED STATES PATENT OFFICE 2,504,126

CEILOMETER RECORDER

Edward G. Howe, Philadelphia, Pa., assignor to General Electric Company, a corporation of New York Application April 12, 1945, Serial No. 588,017

3 Claims. (Cl. 346—33)

My invention relates to recording apparatus and its control, and in particular, to a recorder for producing multiple coordinated records. While the invention may be adapted for other purposes, it will be explained as adapted for recording the elevation and density of cloud ceilings or data from which the elevation and density of cloud ceilings may be readily obtained.

Figure 1:
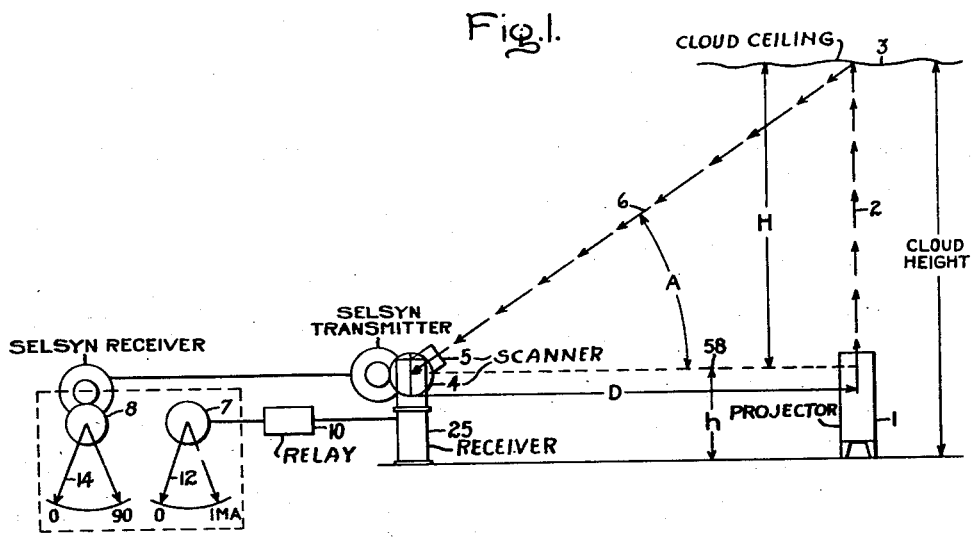
Figure 2:
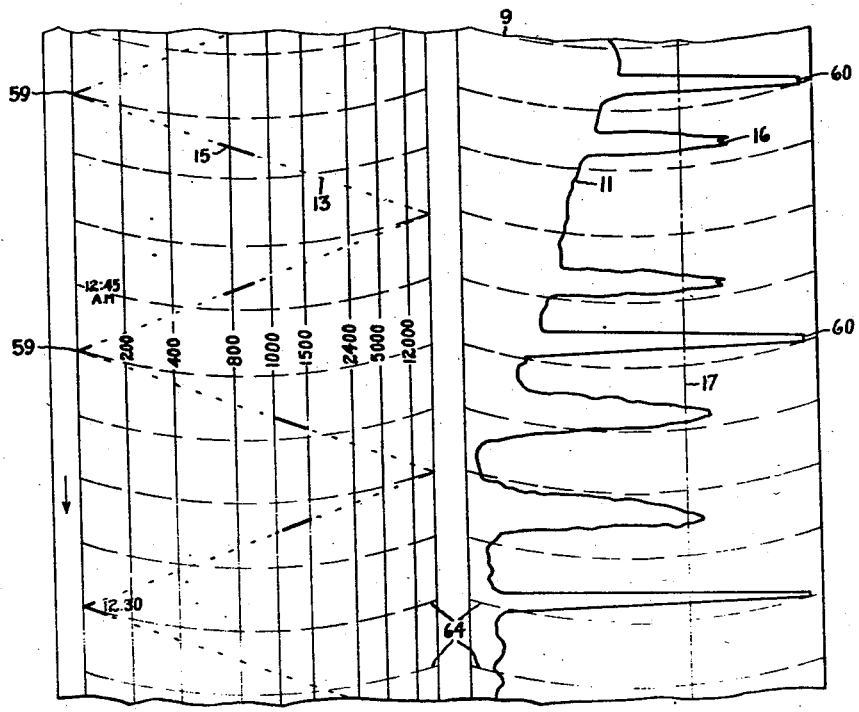
Figure 3:
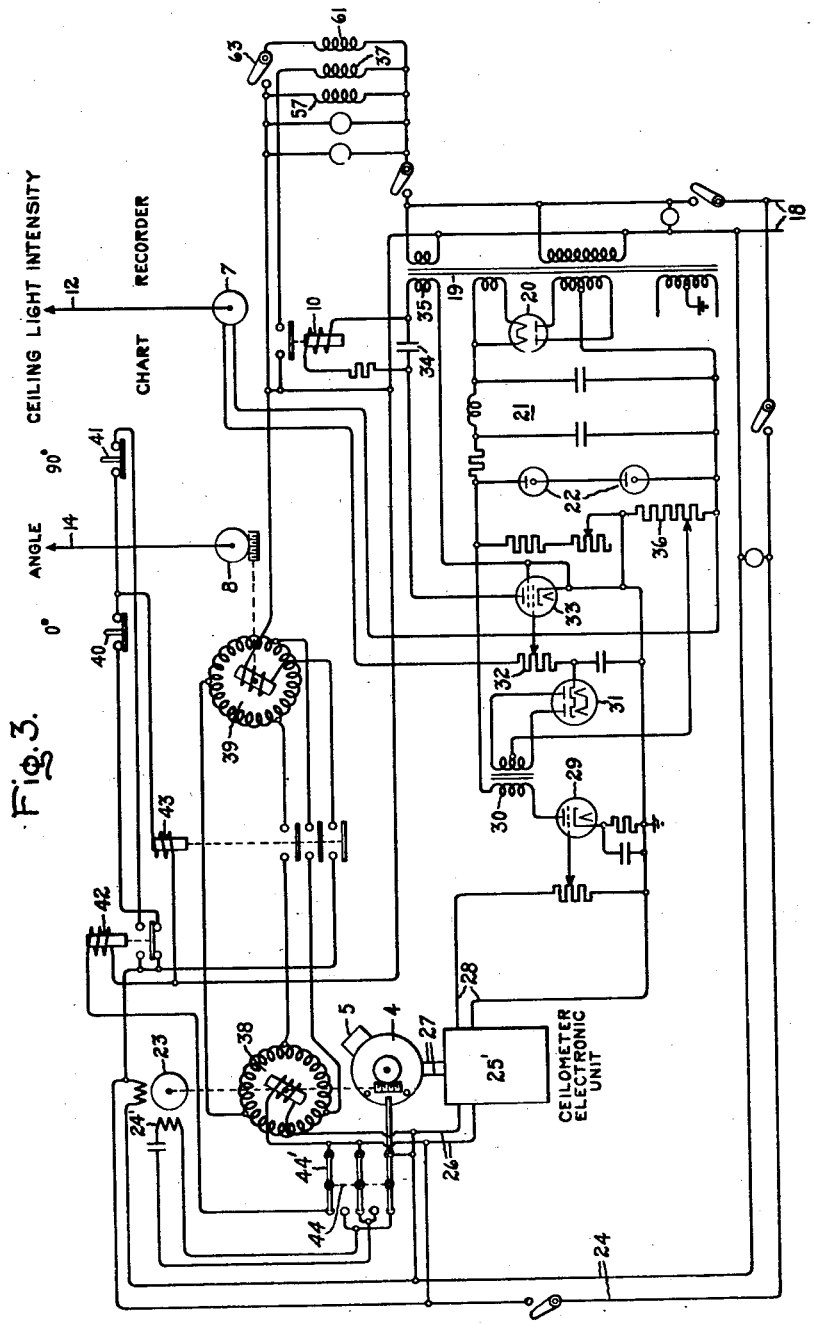
Figure 4:
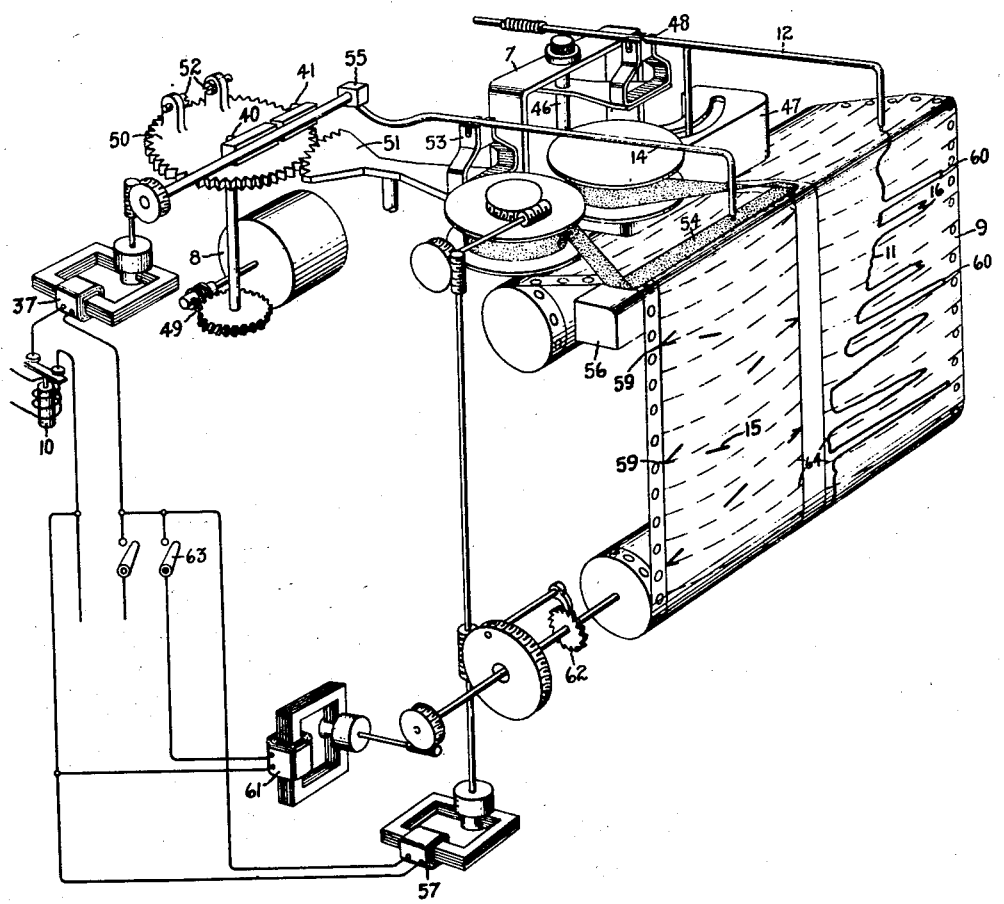

The features of my invention which are believed to be novel and patentable will be pointed out in the claims appended hereto. For a better understanding of my invention, reference is made in the following description to the accompanying drawings in which Fig. 1 represents a schematic representation of a ceilometer equipped with my recorder; Fig. 2 represents the nature of the coordinated records obtained with my recorder; Fig. 3 represents a wiring diagram of the ceilometer and recorder; and Fig. 4 is a perspective view of certain parts of a recorder embodying my invention.

Referring now particularly to Fig. 1, at 1 is a projector which is designed to project a modulated light beam 2 in a vertical direction upward from the ground such that the beam will strike any existing cloud ceiling indicated at 3. Located horizontally along the ground any convenient but known distance from the projector 1 is a photosensitive ceilometer receiver 25 having a scanning head 4 equipped with a hooded light receiving window 5. Suitable parts of 4 including the hooded window 5 are mounted for oscillation on an axis at right angles to a plane formed by the projected beam 2 and a line drawn between the projector 1 and ceilometer 25 such that the light receiving axis of window 5 and the photosensitive receiving element may be rotated in an arc in the plane of the projected light beam 2 through an angle of 90 degrees from a horizontal alignment where the window 5 is directed toward projector 1 to the vertical where the axis of the receiver is parallel with the projected light beam 2. The scanning head unit is designed to respond to only those light rays which are in line with its focal axis. If, now, a cloud ceiling exists such as represented at 3, a portion of the modulated light beam will be reflected by the cloud toward the ceilometer receiver 25 as represented at 6 and when the light receiving axis of such receiver is at the proper angle (this is represented in Fig. 1) to receive such light rays, a current will be produced by the receiver which is proportional to the received light rays or proportional to such reflecting power or density of the cloud ceiling. It should be here pointed out that the transmitted light beam is of a peculiar character in that it flickers at a selected frequency, and that frequency selective electronic detector apparatus is associated with the photoelectric receiver and responds to only such light beam frequency. In this way the ceilometer output is not interfered with by sunlight, and the apparatus may be used either day or night.

The magnitude of this current is transmitted to and recorded by a suitable electrical recording instrument represented at 7, constituting a portion of my recorder. The hood of the ceilometer projector is caused to traverse its 90-degree arc back and forth to scan for cloud ceilings either manually or automatically, and its angular position is continuously transmitted to a second recording instrument 8, constituting the second or angle recording element of my recorder. The two recorders preferably record on a common moving record sheet 9, Fig. 2, or if separate recording sheets are used, they are advanced in synchronism so that the two records are coordinated. The angle recorder may be calibrated directly with a cloud ceiling elevation scale as indicated in Fig. 2 or a separate scale may be provided, since with the angle A of inclination of the ceilometer and the distance D of the ceilometer receiver from the projector 1 known, the elevation H of any cloud ceiling detected is equal to D tangent A. If the apparatus is located any appreciable distance $h$ above the ground level, such distance should also be added to the result; thus, the elevation of the cloud ceiling H=D tangent A+$h$. Satisfactory results are obtained when the distance D is made 1000 feet.

The angle recorder 8 may record continuously but the coordinated record for the ceilometer application becomes somewhat more convenient if only those angles or elevations where definite cloud ceilings greater than a predetermined density or reflecting power are detected and recorded.

To this end the recording operation of the angle recorder is suspended except when the cloud density exceeds a predetermined amount. This may be accomplished through a sensitive threshold relay represented at 10 responsive to the ceiling intensity measurement. In Fig. 2 the record 11 made by stylus 12 of instrument 7 represents cloud ceiling density with minimum values at the left. The lightly dotted line 13 represents the path traversed by the angle recording stylus 14 over the record sheet and the heavy solid portions along this line represent actual recording by this instrument. When the angle recorder stylus is at the left of its swing, the angle A is zero and when at the right of its swing, the angle is 90 degrees.

It is noted that the angle record is present only when the cloud intensity record is above a predetermined value. Thus, the coordinated records at 15 and 16 show that over this particular angle A from about 36 to 41 degrees, the cloud density was appreciable and exceeded a value corresponding to the line 17 on the record sheet. The value 17 at which the angle meter starts to record may correspond to a critical visibility value, as, for example, corresponding to the maximum normal visibility for a specified distance, and is determined by the setting of the relay 10. If the distance D, Fig. 1, is 1000 feet, the cloud ceiling altitude H having the critical intensity corresponding to records 15 and 16 is (tan 38½ degrees) $1000 = .7954 \times 1000 = 800$ feet approximately.

The ceilometer projector combination is not my invention. However, it will be described sufficiently to an understanding of the recorder and its control embodying my invention.

Referring now to Fig. 3, which represents sufficient of the wiring diagram of the ceilometer and recorder to illustrate the recorder control features, power is supplied to the apparatus from a 115-volt, 60-cycle alternating current supply 18. At 19 is a transformer supplying energy to rectifier apparatus 20. The direct current voltage from such rectifier is smoothed and regulated by a filter 21 and voltage regulating tubes 22 to feed amplifier and control equipment associated with the output of the ceilometer receiver.

The movable parts 4 and 5 of the ceilometer receiver, previously referred to, which may be considered as a scanning head are here oscillated through the 90-degree scanning angle by a reversible alternating current capacitor motor 23 at a desired speed, for example, one complete oscillation every twelve minutes. The motor receives its energy from the source 18 through the branch line 24, and a reversing switch 44, operated by lugs on the scanning head when it reaches its two limits of scanning travel, serves to reverse one winding 24' of the motor and accomplish the motor reversing operation. Below the scanning head is the electronic frequency selective detector unit 25' which receives the photoelectric output of the scanning head and converts it into a pulsating direct current voltage proportional to the selected light rays received. The power supply for this unit is represented by leads 26, its connection to the scanning head by the leads 27, and its output by the leads 28. The pulsating voltage output is amplified by an amplifier 29 converted to alternating current by a transformer at 30 and rectified at 31, and the rectified current, which is proportional to the received selected frequency light beam, is measured on the light signal intensity direct current recording instrument 7 previously referred to in Fig. 1. This current is adjustable for calibration purposes at a potentiometer resistance 36. The circuit to instrument 7 contains a resistance 32 for furnishing an adjustable grid bias to an amplifier tube 33 which controls the pulsating direct current in the charging circuit of a condenser 34 supplied through transformer winding 35. The threshold relay 10 which determines whether the angle meter 8 will record or not is connected across the condenser 34. As will be explained, the angle meter 8 records when relay 10 is energized sufficiently to close its contacts, and the value of current to the light intensity recorder 7 where this occurs may be adjusted by the sensitivity grid bias control of tube 33 at potentiometer 32. The motor which causes the angle recorder 8 to record is represented at 37 in Fig. 3.

The angular position of the scanning head at 4 is transmitted to angle recorder 8 through synchronous electrical motion transmitter 38 and receiver 39. These motion transmitting and receiving units make several revolutions while the scanning head is moving through its 90-degree scanning angle, and are geared down to the scanning head and pointer stylus 14, respectively.

The limit switches shown at 40 and 41, the relay switches at 42 and 43, and the switch blade at 44' operated with the reversing switch 44 are for the purpose of synchronizing the angle recording meter 8 with the scanning head at 4 in case these parts get out of synchronism, for example, following manual scanning operation of the ceilometer.

Switch blade 44' which controls the energizing circuit of relay 42 is coupled with reversing switch 44 and is closed only when the scanning head is moving up, at which time angle stylus 14 is moving toward the 90-degree position and limit switch 41. Relay 42 in the energized position closes the energizing circuit of relay 43 through normally closed limit switch 41. If, now, with the ceilometer moving up and the stylus 14 moving to the right in Fig. 3, the latter is out of synchronism and ahead of the ceilometer scanning head; the stylus 14 will open limit switch 41 when it reaches its extreme position. This will deenergize relay 43 and open the motion transmitting connection at relay 43, whereupon stylus 14 will wait until the ceilometer catches up. When the scanning head 4 reaches the 90-degree position, it reverses by the operation of switch 44 and opens switch 44'. Relay 42 drops out and energizes relay 43 through the lower contacts of relay 42 and normally closed limit switch 40. Hence, the motion transmitting system is closed by relay 43 and synchronism is established. In case stylus 14 was behind the scanning head when moving up, it would be ahead when the scanning head next moved down and would reach and open limit switch 40 to deenergize relay 43, and then wait for the scanning head to catch up. It is thus seen that synchronism is established between the scanning head and the angle recorder, if necessary, in not more than one complete scanning cycle. The limit switches and recorder mechanisms are more or less schematically illustrated in the wiring diagram of Fig. 3. The wiring diagram includes pilot lamps and control switches for convenience in testing, etc.

Referring now to Fig. 4 illustrating a partial perspective view of the multiple recorder of my invention, the upper framework of the direct current light intensity or ceiling density meter is represented at 7, its shaft at 46, and its recording stylus at 12. The stylus of instrument 7 is in the form of a hollow capillary tube which dips into the inkwell 47 at one end and rests lightly on the chart 9 at the other end. The stylus is hinged to a support 48 projecting from the shaft and, hence, it records continuously on chart 9 in accordance with the cloud reflected light intensity measurement.

The receiver 8 of the motion transmitting system for the angle recorder is provided with worm gearing 49 and gears 50 and 51 between it and its stylus 14. The limit switches 40 and 41 are operated from adjustable screws 52 threaded through projections on the upper face of gear 50. The stylus 14 is hinged to an off-center projection 53 on gear 51 and produces a record on sheet 9 by tapping a colored carbon ribbon 54 down on the record sheet. The tapping action of stylus 14 is performed by a cam 55 rotated by the motor 37 when the latter is in operation. When the motor 37 is not in operation, stylus 14 is sufficiently raised from recording position for any position of cam so as not to mark on the record sheet 9. When the cam rotates, it lowers the rear end of the stylus, raising the forward end and then lets the forward end drop. There is sufficient resiliency in the stylus to carry its marking end against the record sheet with the carbon ribbon 54 intervening, thereby recording the angular position of the stylus. These repeated operations are generally sufficiently frequent in comparison to the rate of travel of the record sheet and stylus to leave a continuous or practically continuous record as pictured at 15, Fig. 2, for example, during the period or periods when motor 37 is in operation. The stylus 14 does not necessarily need to swing through an angle of 90 degrees and, preferably, its angle of swing is comparatively small, not more than 30 degrees. The angle of swing, however, represents 90 degrees' swing of the scanning head and if desired may have a law of motion corresponding to the tangent of the angle. Beneath the chart there is a suitable platen 56 over which the chart 9 is moved and against which the chart is pressed in a recording operation. This tapping form of recorder is well known and its exact details are immaterial so far as my invention is concerned. I have shown common motor means 57 for advancing the chart 9 and the recording ribbon 54.

The angle meter preferably always records also in the zero angle position as represented with some exaggeration at points 59 on the record sheet, Fig. 2, at the left of the chart. This may be accomplished by projecting a beam of the modulated light horizontally directly from the projector 1 toward the ceilometer as represented at 58, Fig. 1. This, of course, also influences the recording meter 7, and the strength of the direct beam from projector 1 is such as to produce maximum deflections of recorder 7 as represented at points 60 on the chart. These calibrating records that appear at the extreme left and at the extreme right of the chart 9 serve to show that the angle recorder is in synchronism with the scanning head and that the recording mechanism is otherwise in proper operating condition and is in operation, although there may be no cloud ceiling to record. Of course if a dense cloud formation existed at ground level, the records 59 and 60 would not be produced, as then the beam 58 would not reach the ceilometer. The corresponding records which are made by the two recording instruments at the same instant are opposite each other across the chart at right angles to its direction of movement. Thus, corresponding coordinated records of ceiling densities and altitude are produced in a manner which facilitates their easy interpretation. Fig. 2 shows typical records obtained with a chart speed of one inch per minute and a complete scanning cycle of twelve minutes' duration. This record shows that the cloud density is increasing and the ceiling is lowering. The time of day may be printed or recorded on the record sheet, if desired.

The dotted lines 13 shown in the record sheet of Fig. 2 are for the purpose of indicating the path of travel of the angle recorder over the record sheet when not recording and are not present in the actual record, and the dash lines are present to indicate the time coordination between the two records. For this purpose a record sheet with suitably spaced printed time coordinating lines across it curved to conform to the areas of travel of the two recording styli may be used as represented at 64 in Fig. 2. At times of rapidly changing cloud ceiling or during periods of dense cloud ceilings, the chart may be arranged to have a higher speed than at other times should that be desired. A change in chart speed does not interfere with the coordinated nature or value calibration of the altitude and density records produced.

In Figs. 3 and 4, 61 represents a motor for driving the chart at high speed and receiving its supply with the stylus operating motor 37 of the angle recorder through the threshold relay 10 so that when ceilings are detected above the predetermined density, the chart 9 may be operated at high speed. The slow speed chart motor 57 continues to run but it is connected with the chart drive by an overrunning clutch at 62, so that it performs no function other than advancing the type ribbon 54 when motor 61 is driving the chart. The high speed motor 61 may be thus used or not, as desired, by closing or opening a switch 63. A suitable arrangement would be a slow speed chart drive of ½ inch per hour and a high speed chart drive of ½ inch per minute. A speed changing chart drive which assures proper time coordination of a time printed chart is described in United States Letters Patent No. 1,598,595 to Angus, September 7, 1926.

The recorder principle described above is generally applicable for other uses. For example, the magnitude recorder may respond to a scanning measuring device which measures hardness, temperature, thickness, etc. of a material or an area which is scanned and used in cooperation with a position recorder recording the relative position of the scanning instrument with respect to the material or area scanned only when the measurement being made exceeds or is less than a predetermined value. Hence, I do not wish to limit my invention to the particular ceilometer application described.

What I claim as new and desire to secure by Letters Patent of the United States is:

1. Ceilometer recording apparatus comprising a projector for projecting light rays upward toward any cloud ceiling that may exist above it, photosensitive apparatus spaced horizontally a known distance from said projector adapted to respond to such light rays reflected thereto from a cloud ceiling, said photosensitive apparatus including scanning means rotatable through an angle of the order of 90 degrees whereby the photosensitive apparatus may be selectively directed to receive such reflected light rays from cloud ceilings of any altitude above said projector, means responsive to the photosensitive means for producing a current proportional to the density characteristic of any cloud ceiling detected and a multiple recorder having a recording element responsive to the magnitude of such current and a recording element responsive to the angular position of said scanning means, means for moving a record sheet past said recording instruments such that such instruments may produce side-by-side records thereon transversely of the record sheet, said current magnitude responsive instrument producing a continuous record on such record sheet when the apparatus is in operation, means associated with the angular position responsive element and controlled by such current for producing a record corresponding to the angular position of said scanning means only when said current exceeds a predetermined value, the records corresponding to angular position being produced simultaneously with the current magnitude records to which they correspond on coordinated transverse portions of said record sheet whereby the composite record represents both the density characteristic and elevation of all cloud ceilings the density characteristic of which exceeds a predetermined value.

2. In combination with a scanning type of measuring apparatus, an electrical magnitude recording instrument responsive to a current which is proportional to the measurement of such apparatus, a recording instrument responsive to the relative scanning movement of such measuring apparatus, means for moving a record sheet past said recording instruments whereby both may record on side-by-side transverse portions of such record sheet, said magnitude recording instrument recording continuously when the apparatus is in operation, and means responsive to such current for causing the scanning movement recording instrument to record only when such current exceeds a predetermined measurement value, the last mentioned records being produced simultaneously with the current magnitude records to which they correspond with corresponding records coordinated on side-by-side portions of such record sheet.

3. In combination with a scanning type of measuring apparatus which produces a current proportional to its measurement, an electrical recording instrument responsive to the magnitude of such current, a portion of said measuring apparatus having a scanning movement in a plane back and forth through a definite angle, a recording instrument responsive to such scanning movement having a recording stylus which oscillates back and forth through an angle proportional to such scanning angle and in synchronism therewith, means for moving a record sheet past said recording instruments whereby both may record simultaneously on side-by-side transverse portions of such record sheet, said magnitude responsive recording instrument recording on said record sheet continuously while the apparatus is in operation, and means responsive to the magnitude of such current for causing the stylus of the angle recorder to produce records only when such current exceeds a predetermined value, and means which is independent of the quantity measured by the scanning apparatus for causing the current produced thereby to exceed such predetermined value only when the scanning movement thereof is at one end of its limit of travel.

EDWARD G. HOWE.

REFERENCES CITED

The following references are of record in the file of this patent:

UNITED STATES PATENTS

| Number | Name | Date |
|---|---|---|
| 778,451 | Hartley et al. | Dec. 27, 1904 |
| 1,793,245 | Phelps | Feb. 17, 1931 |
| 1,850,978 | Sperry | Mar. 22, 1932 |
| 2,070,178 | Pottenger, Jr. et al. | Feb. 9, 1937 |
| 2,133,241 | Baker | Oct. 11, 1938 |
| 2,297,534 | Brulin | Sept. 29, 1942 |

FOREIGN PATENTS

| Number | Country | Date |
|---|---|---|
| 501,963 | Germany | July 8, 1930 |